(12) United States Patent
Kaczorowski

(10) Patent No.: US 11,892,803 B2
(45) Date of Patent: Feb. 6, 2024

(54) HOLOGRAPHIC DISPLAY SYSTEM AND METHOD

(71) Applicant: VividQ Limited, London (GB)

(72) Inventor: Andrzej Kaczorowski, London (GB)

(73) Assignee: VividQ Limited, London (GB)

( * ) Notice: Subject to any disclaimer, the term of this patent is extended or adjusted under 35 U.S.C. 154(b) by 394 days.

(21) Appl. No.: 17/368,581

(22) Filed: Jul. 6, 2021

(65) Prior Publication Data
US 2021/0333756 A1    Oct. 28, 2021

Related U.S. Application Data

(63) Continuation of application No. PCT/GB2020/050061, filed on Jan. 13, 2020.

(30) Foreign Application Priority Data

Jan. 14, 2019    (GB) ..................................... 1900504

(51) Int. Cl.
*G03H 1/22* (2006.01)
*G03H 1/08* (2006.01)
*G03H 1/16* (2006.01)

(52) U.S. Cl.
CPC ......... *G03H 1/2294* (2013.01); *G03H 1/0866* (2013.01); *G03H 1/16* (2013.01);
(Continued)

(58) Field of Classification Search
CPC ...... G03H 1/2294; G03H 1/0866; G03H 1/16; G03H 1/0808; G03H 1/26;
(Continued)

(56) References Cited

U.S. PATENT DOCUMENTS 5,363,186 A * 11/1994 Cohn ..................... G02B 26/06
356/28
8,294,749 B2   10/2012 Cable
(Continued)

FOREIGN PATENT DOCUMENTS

CN    101416407 A    4/2009
CN    103293935 A    9/2013
(Continued)

OTHER PUBLICATIONS

International Search Report and Written Opinion dated Feb. 28, 2020 for PCT Application No. PCT/GB2020/050061.
(Continued)

*Primary Examiner* — Stephone B Allen
*Assistant Examiner* — Jyotsna V Dabbi
(74) *Attorney, Agent, or Firm* — EIP US LLP

(57) ABSTRACT

A holographic image display system comprising a processor receiving image data at an input and producing output hologram data based on the image data. The image data comprises three-dimensional image data that is separable into a plurality of two-dimensional image layers at different image planes. The processor is configured to: a) perform a space-frequency transform on each image layer to provide a transformed image layer, b) apply a focus factor to each transformed image layer, c) apply a pseudo-random phase factor to each transformed image layer, and d) sum the transformed image layers to form a holographic sub-frame, e) repeat steps (c) and (d) for a plurality of iterations, applying a different pseudo-random phase factor to the transformed image layers in each iteration to form a plurality of holographic sub-frames; and f) drive a spatial light modulator with the holographic sub-frames in rapid temporal succession to generate a holographic image.

20 Claims, 8 Drawing Sheets

(52) U.S. Cl.
CPC . *G03H 2001/2297* (2013.01); *G03H 2210/33* (2013.01); *G03H 2222/20* (2013.01); *G03H 2225/32* (2013.01)

(58) Field of Classification Search
CPC ... G03H 2001/2297; G03H 2001/0825; G03H 2001/2263; G03H 2210/33; G03H 2210/32; G03H 2210/45; G03H 2210/454; G03H 2210/441; G03H 2222/20; G03H 2222/34; G03H 2222/33; G03H 2222/23; G03H 2225/32; G03H 2225/12; G03H 2225/22; G03H 1/32; G03H 2226/02
USPC .......................................................... 359/9
See application file for complete search history.

(56) References Cited

U.S. PATENT DOCUMENTS

| 2004/0027627 | A1  | 2/2004  | Kitmura |               |
|---|---|---|---|---|
| 2008/0259419 | A1* | 10/2008 | Wilson  | G03H 1/0808   |
|              |     |         |         | 359/9         |
| 2009/0128619 | A1* | 5/2009  | Mash    | G03H 1/2294   |
|              |     |         |         | 345/545       |
| 2010/0172001 | A1  | 8/2010  | Johnson |               |
| 2010/0277566 | A1* | 11/2010 | Cable   | G03H 1/02     |
|              |     |         |         | 348/40        |
| 2011/0157667 | A1  | 6/2011  | Lacoste et al. |        |
| 2012/0224062 | A1* | 9/2012  | Lacoste | G09G 5/14     |
|              |     |         |         | 348/148       |
| 2015/0277378 | A1  | 10/2015 | Smithwick et al. |      |

FOREIGN PATENT DOCUMENTS

| CN | 105954993 A | 9/2016 | |
|---|---|---|---|
| JP | 2010511899 T | 4/2010 | |
| JP | 2011507022 T | 3/2011 | |
| WO | 2007031797 A2 | 3/2007 | |
| WO | WO-2008099211 A2 * | 8/2008 | ........... G03H 1/2249 |
| WO | 2009074819 A2 | 6/2009 | |
| WO | 2008070581 A2 | 6/2012 | |

OTHER PUBLICATIONS

Mohamed Haouat et al: "Reduction of speckle noise in holographic images using spatial jittering in numerical reconstructions" Mar. 3, 2017.
Bianco V et al: "Random resampling masks: a non-Bayesian one-shot strategy for noise reduction in digital holography" Mar. 1, 2013.
J. P. Freeman "Visor projected helmet mounted display for fast jet aviators using a fourier video projector," Ph.D. dissertation, Cambridge Univ., Cambridge, U.K., 2009. (Published by University of Cambridge 2010).
A. Kaczorowski "Adaptive Aberration Correction for Holographic Projectors", Ph.D. dissertation, Cambridge Univ., Cambridge, U.K., 2017 (Published by University of Cambridge 2018: https://www.repository.cam.ac.uk/handle/1810/270322).

* cited by examiner

HOLOGRAPHIC DISPLAY SYSTEM AND METHOD

CROSS-REFERENCE TO RELATED APPLICATIONS

This application is a continuation of International Application No. PCT/GB2020/050061, filed Jan. 13, 2020, which claims priority to GB Application No. GB1900504.0, filed Jan. 14, 2019, under 35 U.S.C. § 119(a). Each of the above-referenced patent applications is incorporated by reference in its entirety.

BACKGROUND OF THE INVENTION

Field of the Invention

The invention relates to the field of digital, computer-generated holography. The invention relates in particular to the generation of diffractive holographic patterns displayed on a Spatial Light Modulator in a manner that reduces computational load.

Description of the Related Technology

The capture and display of digital image data continues to become more sophisticated. Real-time video data capture, transmission and display is now commonplace, with services such as Skype and Facetime available over mobile data networks. The rendering of highly realistic images in online computer games is also now widespread.

The generation of three-dimensional images is also now becoming more widespread. The mathematics and technology required to display diffractive holographic images based on digital image data is well understood. But the amount of data that needs to be processed, particularly for moving image holograms, can be massive and the computational requirements are very high. For that reason, holographic display systems are still relatively specialist products, not widely available for consumers.

One previously described technique for displaying holographic images that reduces the perceived level of noise in a hologram is One-Step Phase Retrieval (OSPR). This technique is described in WO2007/031797 for example. Essentially the technique comprises displaying a number of sub-frame holograms in rapid succession in place of a single hologram image. Each sub-frame hologram has a different random phase factor deliberately introduced into it to create an independent noise field. But the sub-frame holograms are displayed rapidly so that the human eye only perceives an average sub-frame. The averaging of the noise fields actually results in the perception of a less noisy hologram than each individual sub-frame hologram.

This technique has the advantage of reducing computational requirements compared to techniques that attempt to reproduce a similar quality holographic image based on displaying only a single hologram frame, such as iterative techniques based on the Gerchberg-Saxton algorithm. However, the number of sub-frames required for perception of a high quality image is still relatively large and for each sub-frame it is necessary to perform a number of fast Fourier transform operations. This requires a fast and high bandwidth memory as well as a large computational resources and makes practical implementation difficult.

It would be desirable to be able to reduce the computational resources required for generating and displaying high quality holographic images.

SUMMARY

In a first aspect of the invention, there is provided a holographic image display system comprising:
  a coherent, or a partially-coherent light source;
  a spatial light modulator illuminated by the coherent, or partially-coherent light source; and
  a processor configured to drive the spatial light modulator with output hologram data, the processor receiving image data at an input and producing output hologram data based on the image data,
  wherein the image data comprises three-dimensional image data that is separable into a plurality of two-dimensional image layers at different image planes, and
  wherein the processor is configured to:
   a) perform a space-frequency transform, such as a Fourier transform, on each image layer to provide a transformed image layer,
   b) apply a focus factor to each transformed image layer,
   c) apply a pseudo-random phase factor to each transformed image layer, and
   d) sum the transformed image layers to form a holographic sub-frame,
   e) repeat steps (c) and (d) for a plurality of iterations, applying a different pseudo-random phase factor to the transformed image layers in each iteration to form a plurality of holographic sub-frames, the output hologram data comprising the plurality of holographic sub-frames; and
   f) drive the spatial light modulator with the holographic sub-frames in rapid temporal succession to generate a holographic image.

The space-frequency transform is preferably a Fourier transform, but other transforms, such as a Fresnel transform, may be used. If a Fresnel transform is used, the Fresnel transform incorporates step (b), applying a focus factor, into the transform. In that case, steps (a) and (b) are performed in a single operation.

By applying a pseudo-random phase factor to each image layer after it has been transformed, a large number of holographic sub-frames can be generated without the need to perform a Fourier transform for each sub-frame. This means a large number of sub-frames can be generated with relatively low computational resource requirements. This in turn means a high-quality perceived image can be generated within a short time frame. Advantageously, the same pseudo-random phase factor can be applied to all of the pixels within each transformed image layer.

The processor is advantageously configured to apply an initial random phase factor to each image layer in a step prior to step (a), referred to herein as step (x). Each image layer may be copied a plurality of times and a different initial random phase factor applied to each copy of a given image layer to generate a plurality of full-complex image layers. The processor may be configured to carry out steps (a) to (f) on each of the plurality of complex image layers to produce a plurality of sets of holographic sub-frames. In other words, the holographic image display system may be configured to repeat steps (x) to (e) for a plurality of iterations for each image layer prior to performing step (f), with a different initial random phase factor applied to corresponding image layers in each iteration, to produce the plurality of holographic sub-frames. The processor may be configured to drive the spatial light modulator with each of the plurality of sets of holographic sub-frames in rapid temporal succession, to generate the holographically-generated image.

The image data may comprise a stream of image frames. Each image frame may comprise a plurality of two-dimensional image layers at different image planes. The processor may be configured to generate a plurality of holographic sub-frames or a plurality of sets of holographic sub-frames for each image frame and to drive the spatial light modulator with each plurality of holographic sub-frames or each plurality of sets of holographic sub-frames in succession to generate a moving holographic image.

Each initial random phase factor comprises a phase value for each pixel in the image layer. Different phase values may be applied to different pixels. The phase values are advantageously statistically distributed uniformly across the image layer. Advantageously, a random phase factor is applied to each different image layer within an image frame. However, the same random phase factors may be used for each successive image frame in a stream of image frames. So only a single set of initial random phase factors for each of the image layers needs to be generated. The set of initial random phase factors may be stored in a non-volatile memory within the display system.

Similarly, the pseudo-random phase factor applied to each transformed image layer in step (c) is advantageously different for each image layer within a single image frame. But the same pseudo-random phase factors may be used again in successive image frames. Each of the pseudo-random phase factors may comprise a single value applied to all of the pixels in a transformed image layer.

The focus factor applied to each transformed image layer corresponds to the position of that layer along an axis orthogonal to the plane of each of the image layers. The application of the focus factor may be performed subsequent to the space frequency transform or may be performed as part of the space frequency transform.

Each image layer may be a lower resolution image layer. Each lower resolution image layer is formed by splitting a higher resolution image layer into a plurality of lower resolution image layers. In particular, the image data may be in the form of plurality of higher resolution two-dimensional image layers at different image planes. The processor may be configured to split each higher resolution two-dimensional image layer into a plurality of lower resolution image layers in the same image plane. Each higher resolution image layer may comprise a plurality of pixels. The processor may be configured to split each higher resolution image layer into a plurality of the lower resolution image layers, using a tiling technique. Each lower resolution image layer comprises a plurality of pixels from the higher resolution image layer, so that every pixel in the higher resolution image layer is present in at least one lower resolution image layer. Adjacent pixels in the higher resolution image layer may advantageously be in different lower resolution image layers. The processor may then perform steps (a) to (e) on each lower resolution image layer in parallel to form the output hologram data. In step (f) the processor may drive the spatial light modulator with holographic sub-frames resulting from the same higher resolution two-dimensional image layer in rapid temporal succession. The lower resolution holographic sub-frames may be tilted or shifted in the replay field to ensure that they are correctly positioned.

The tiling may be performed in one or in two dimensions. In the case of tiling performed in one dimension, pixels in the higher resolution image layer that are adjacent to one another in a first dimension of the two dimensional higher resolution image layer appear in different lower resolution image layers, but pixels in the higher resolution image layer that are adjacent to one another in the second dimension of the two dimensional higher resolution image layer appear in the same lower resolution image layer. In the case of tiling performed in two dimensions, pixels in the higher resolution image layer that are adjacent to one another in either dimension appear in different lower resolution image layers.

A tiling strategy has a couple of advantages. First, it has been noted in the literature that whenever two spatially adjacent pixels are displayed next to one another simultaneously they can interfere with one another, depending on their relative phase. By driving the spatial light modulator to display adjacent pixels in different holographic sub-frames which are temporally separate, such interference can be avoided, leading to higher quality images. Second, splitting each image layer into a plurality of lower resolution image layers prior to the step of performing a Fourier transform results in a computational benefit if instead of generating a plurality of higher resolution holographic sub-frames, a plurality of lower resolution holographic sub-frames are generated.

The image data may comprise a point cloud comprising a plurality of points in three dimensional space, and the point cloud may be separated into a plurality of image layers comprising a plurality of pixels, some of which are occupied by points of the point cloud. The number of image layers within a single image frame may be chosen by the system designer, but 256 layers is a convenient number. The processor may be configured to combine pixels from a plurality of adjacent image layers into a single, combined image layer before step (a). The processor may be configured to combine pixels from every n adjacent image layers into a different combined image layer, where n is an integer greater than 1. This is beneficial if the number of image layers in the input image data is too high to allow static holographic images to be generated within the time frame required for displaying a moving holographic image. For example, if the input image data is separated into 256 layers, the processor may be configured to combine every four layers into a single combined image layer. In that case the pixels from input image layers 1, 2, 3 and 4 are contained in the first combined image layer, the pixels from input image layers 5, 6, 7, and 8 are contained in the second combined image layer, and so on. This would speed up execution time by a factor of four.

The processor may be configured to reorder the image layers so that image layers that contain at least one occupied pixel are adjacent to one another, and wherein step (a) is performed only for the layers that contain at least one occupied pixel. This is particularly beneficial when the processor does not have branch prediction capabilities. By rearranging the layers prior to performing the Fourier transforms, a significant speed up in processing time can be achieved for some images.

In accordance with a second aspect of the invention, there is provided a method of generating a hologram from a three-dimensional image data set, the three-dimensional data set being separated into a plurality of two-dimensional image layers at different image planes, comprising:
a) performing a space-frequency transform, such as a Fourier transform on each image layer to provide a transformed image layer,
b) applying a focus factor to each transformed image layer,
c) applying a pseudo-random phase factor to each transformed image layer, and
d) combining the transformed image layers to form a holographic sub-frame,
e) repeating steps (c) and (d) for a plurality of iterations, applying a different pseudo-random phase factor to the transformed image layers in each iteration to form a plurality of holographic sub-frames; and f) driving a spatial light modulator with the holographic sub-frames in rapid temporal succession and illuminating the spatial light modulator with a coherent light source to generate a hologram.

The method may comprise the step of applying an additional pseudo-random phase factor to each image layer prior to step (a). The method may comprise applying a different initial pseudo-random phase factor to each of a plurality of copies of a given image layer to generate a plurality of complex image layers. Steps (a) to (f) may be performed on each of the plurality of complex image layers to produce a plurality of sets of holographic sub-frames. The spatial light modulator may be driven with each of the plurality of sets of holographic sub-frames in rapid temporal succession, to generate the holographic image.

The image data may comprise a stream of image frames. Each image frame may comprise a plurality of two-dimensional image layers at different image planes. The method may comprise generating a plurality of holographic sub-frames or a plurality of sets of holographic sub-frames for each image frame and driving the spatial light modulator with each plurality of holographic sub-frames or each plurality of sets of holographic sub-frames in succession to generate a moving holographic image.

Each image layer may be a lower resolution image layer. Each lower resolution image layer may be formed by splitting a higher resolution image layer into a plurality of lower resolution image layers in the image plane. In particular, the image data may be in the form of plurality of higher resolution two-dimensional image layers at different image planes. The method may comprise splitting each higher resolution two-dimensional image layer into a plurality of lower resolution image layers in the same image plane. Each higher resolution image layer may comprise a plurality of pixels. The method may comprise splitting each higher resolution image layer into a plurality of the lower resolution image layers, such that adjacent pixels across at least one dimension in the higher resolution image layer are in different lower resolution image layers. For example, each higher resolution image layer may be split into two or four lower resolution image layers. Steps (a) to (e) may then be performed on each lower resolution image layer in parallel to form the output hologram data. In step (f) the spatial light modulator may be driven with holographic sub-frames resulting from the same higher resolution two-dimensional image layer in rapid temporal succession. The holographic sub-frames resulting from low resolution image layers belonging to the same higher resolution image layer may be tilted or shifted in the hologram plane so that they do not overlie each other in the replay field.

The image data may comprise a point cloud comprising a plurality of points in three dimensional space. The method may comprise separating the point cloud into image layers, each comprising a plurality of pixels. Some of the pixels are occupied by points from the point cloud. The image data may comprise a plurality of image layers and the method may comprise combining pixels from a plurality of adjacent image layers into a single, combined image layer before step (a). The method may comprise combining pixels from every n adjacent image layers into a different combined image layer, where n is an integer greater than 1.

The method may comprise reordering the image layers so that image layers that contain at least one pixel occupied by a point from the point cloud are adjacent to one another, wherein step (a) is performed only for layers that contain at least one occupied pixel. Image layers that do not contain any occupied pixels are removed from between layers that do contain at least one occupied pixel.

In accordance with a third aspect of the invention, there is provided a holographic image display system comprising:

a coherent, or a partially-coherent light source;

a spatial light modulator illuminated by the coherent, or partially-coherent light source;

a processor configured to drive the spatial light modulator with output hologram data, the processor receiving image data at an input and producing output hologram data based on the image data, wherein the image data comprises three-dimensional image data that is separable into a plurality of two-dimensional image layers at different image planes, wherein each image layer comprises a plurality of pixels, and wherein the processor is configured to:

separate each image layer into a plurality of sub-images, such that adjacent pixels in the image layer are in different sub-images, perform a space-frequency transform, such as a Fourier transform, on each sub-image to provide a plurality of transformed sub-images, and combine the transformed sub-images to form a complete transformed image layer, apply a focus factor to each transformed image layer, combine the transformed image layers to form a holographic sub-frame, and drive the spatial light modulator with the holographic sub-frames in rapid temporal succession to generate a hologram.

As used herein, "adjacent" means adjacent in at least one dimension or direction. In particular, the requirement for adjacent pixels in the image layer to be in different sub-images may refer to adjacency across only one dimension of the two-dimensional image layers.

In should be clear that features described in relation to one aspect of the invention may be applied to other aspects of the invention. In particular features of first aspect may be applied to second and third aspects of the invention.

BRIEF DESCRIPTION OF THE DRAWINGS

Embodiments of the invention will now be described in detail, with reference to the accompanying drawings, in which.

DETAILED DESCRIPTION OF CERTAIN INVENTIVE EMBODIMENTS

Figure 1:
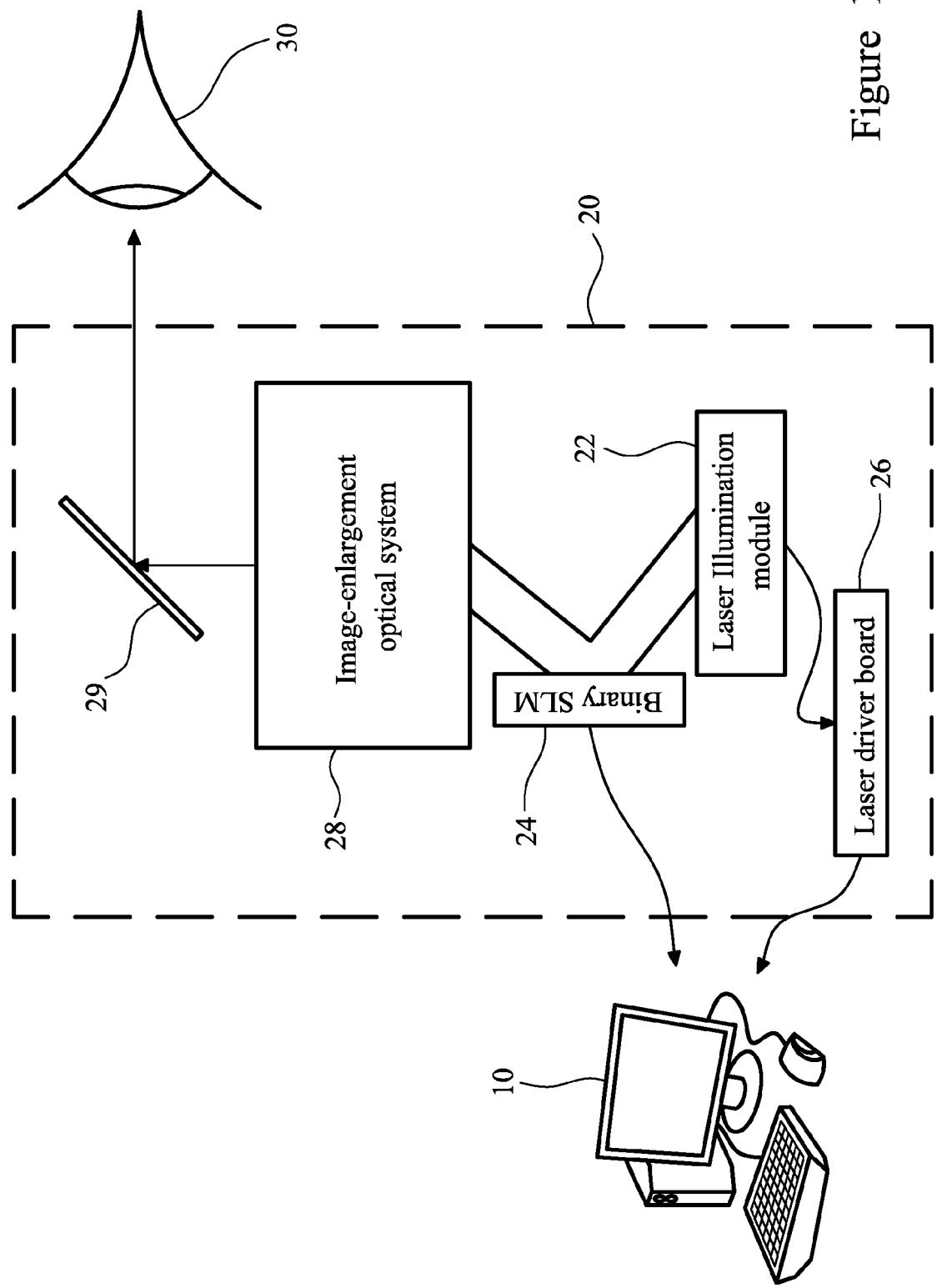
FIG. 1 is a schematic illustration of a holographic display system in accordance with the invention.

FIG. 1 is a schematic illustration of a holographic display system. The system comprises a holographic projector 20 and a driving computer 10. The holographic projector comprises laser illumination module 22 that is configured to illuminate a binary spatial light modulator (SLM) 24. The laser illumination module comprises three laser diodes (red, green, blue). The laser illumination module combines and collimates the outputs from the laser diodes. The laser illumination module 22 is connected to the driving computer through a laser driver board 26. The binary SLM 24 is also connected to and controlled by the driving computer 10. The SLM may be a liquid crystal device (LCD) or a digital micro-mirror device (DMD). The laser light from the laser illumination module is reflected from (or transmitted through) the SLM to form a hologram. The SLM provides a synchronisation signal to the computer 10 or directly to the laser driver board 26. The laser driver board 26 schedules the laser pulses to match the frames displayed by the SLM. The light from the SLM is passed through an optical image enlargement system 28 and a beam splitter 29 before reaching a user's eye 30. The optical image enlargement system 25 may be a multi-lens optical system.

The driving computer controls the SLM to control the properties of the hologram. In this embodiment, the system is configured to generate a moving holographic image by generating a sequence of holographic frames displayed in rapid succession.

Figure 2:
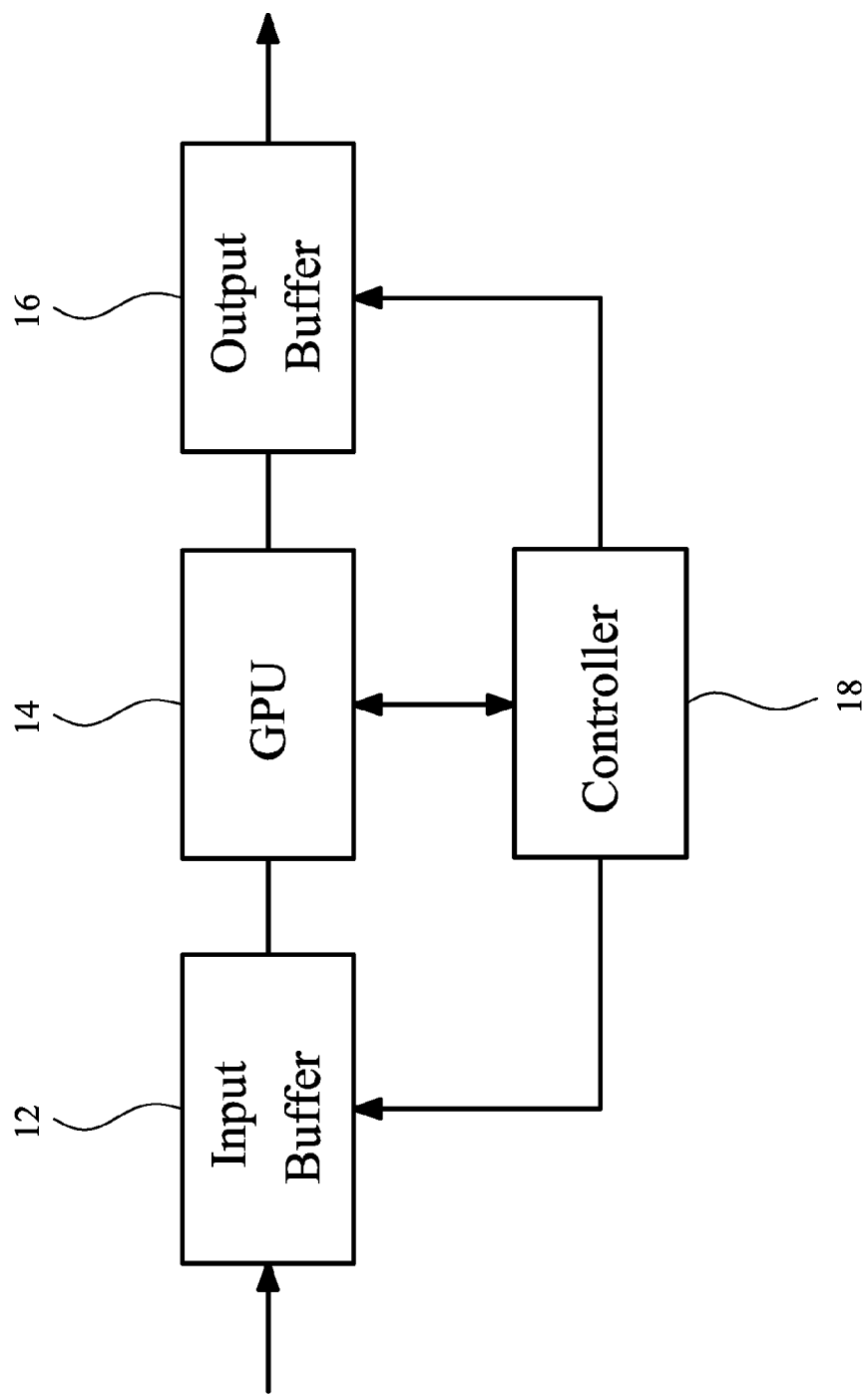
FIG. 2 is a schematic illustration of the components of a computer system configured to carry out processing steps in accordance with the invention.

FIG. 2 is a schematic illustration of the basic components of the driving computer involved in driving the SLM. The computer comprises an input buffer 12, a graphics processing unit (GPU) 14 and an output buffer 16, together with a controller 18. The input buffer 12 receives three dimensional image data in the form of a series of three dimensional frames, each three dimensional frame divided into a plurality of image slices or layers. Each image layer is essentially a two dimensional image, with the slices arrayed along a z-axis of the three dimensional image.

Figure 3:
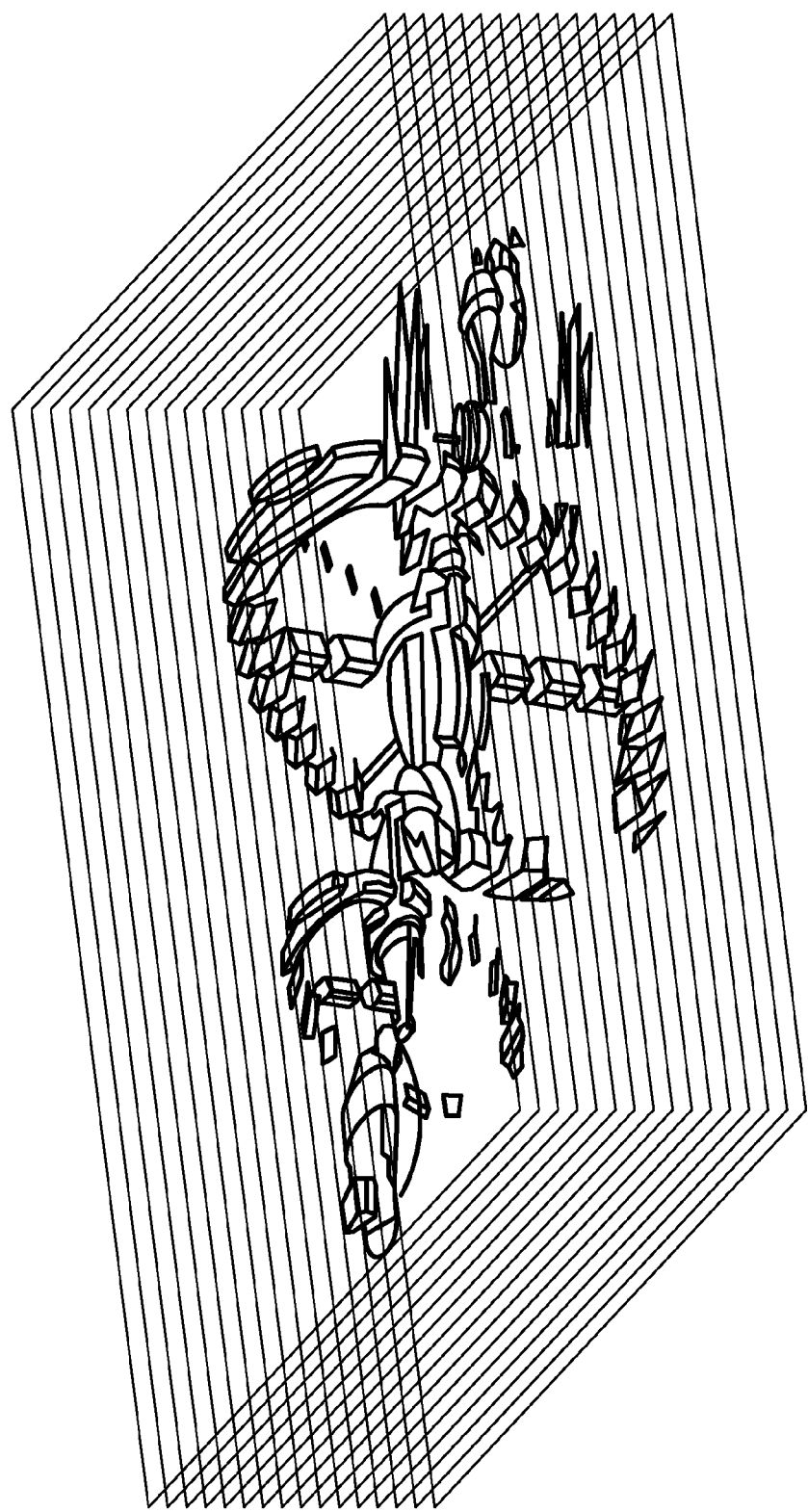
FIG. 3 illustrates the division of a point cloud into a plurality of image layers.

FIG. 3 illustrates the division of a three-dimensional point cloud image into image layers. For clarity of illustration the image is divided into only 16 layers, but in practical implementations a larger number, typically 256, of layers are used.

The image layers are processed by the GPU 14 to produce a sequence of holographic frames (or sub-frames as will be described). The holographic frames are output to the output buffer. The holographic frames are then output to the spatial light modulator 24 from the output buffer, under the control of the controller. The holographic frames output to the SLM 24 may each comprise a 24-bit bit map, with 8 bits for each of the red, green and blue channels. These may be each be split into 24 binary holographic frames by the SLM driver, which are then displayed sequentially on the SLM.

The GPU is programmed to process the input image layers in accordance with a process described with reference to FIGS. 4, 5, 6, 7, 8 and 9 below.

Figure 4:
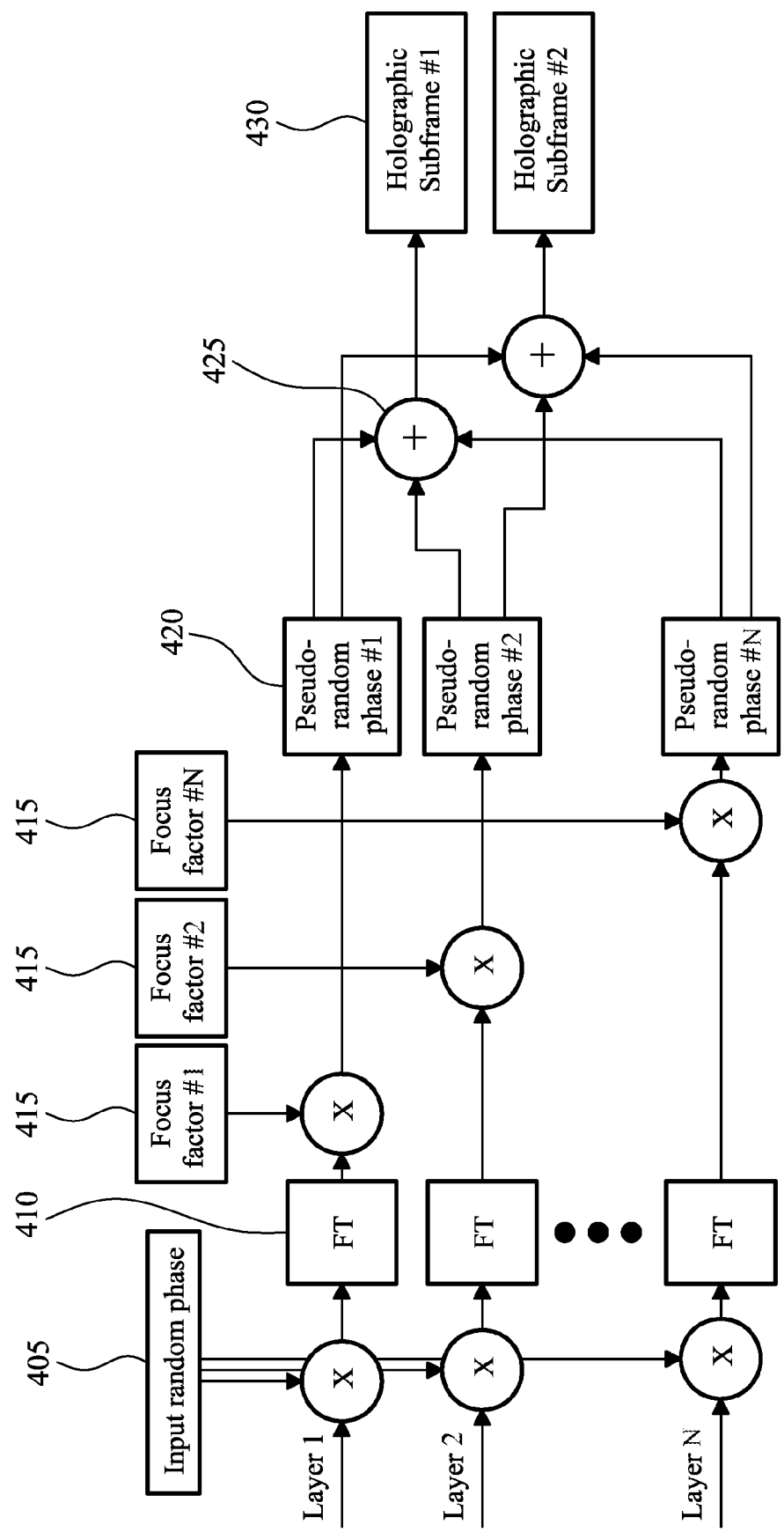
FIG. 4 illustrates an image processing method in accordance with the invention.

FIG. 4 illustrates a process of generating a plurality of holographic sub-frames from a single image frame. The image frame comprises a plurality of image layers, as previously described. FIG. 4 illustrates N image layers. In this example N is equal to 256 but only three image layers are shown for ease of illustration.

Without any random phase added, the contribution to the final hologram, coming from a single image layer $\psi(u, v, z)$ at a depth $z=z_q$ can be written as:

$$H_q(x, y) = e^{-i\frac{\pi}{\lambda z_q}(x^2+y^2)} F^{-1}\{\psi(u, v, z_q) i\lambda z_q e^{-ikz_q} e^{-i\frac{\pi}{\lambda z_q}(u^2+v^2)}\}$$

Taking into account that the initial object phase in a display scenario can be chosen randomly, this can be approximated to:

$$H_q(x, y) = \lambda z_q e^{-i\frac{\alpha}{z_q}Z_3(x,y)} F^{-1}\{\psi(u, v, z_q)$$

Where $Z_3(x, y)$ is the third Zernike polynomial (the quadratic phase focus factor):

$$Z_3(x,y) = (x^2+y^2)$$

and $\alpha$ is a scaling constant that depends on the physical setup of the system (e.g. the properties of the Spatial Light Modulator and laser wavelength The contribution in the complex filed for all layers is a summation:

$$H(x, y) = \lambda \sum_{q=0}^{layercount} z_q e^{-i\frac{\alpha}{z_q}Z_3(x,y)} F^{-1}\{\psi(u, v, z_q)\}$$

If $$\varphi_q(x, y) = \frac{\alpha}{z_q} Z_3(x, y),$$

then the summation can be written as:

$$H(x,y) = \lambda \Sigma_{q=0}^{layercount} z_q e^{-i\varphi_q(x,y)} F^{-1}\{\psi(u,v,z_q)\}$$

However, an initial random phase factor is added to each layer in step 405. The initial random phase factor applied to each image layer comprises a phase value for each pixel in the image layer. The phase values have a statistically uniform distribution across the image layer. So each random phase factor may comprise a 2048×2048 matrix of random numbers to be applied to an image layer comprising 2048× 2048 pixels. Each image layer is provided with a different initial random phase factor. However, the same initial random phase factor may be applied to subsequent image frames in a video stream of image layers.

The input random phase can be expressed as $\Theta_j(u,v)$. The complex field for each image frame can then be written as:

$$H_j(x, y) = \lambda \sum_{q=0}^{layercount} z_q e^{-i\varphi_q(x,y)} F^{-1}\{\psi(u, v, z_q) e^{i2\pi\vartheta_j(u,v)}\}$$

Following the application of the initial random phase factor, each image layer undergoes the Fourier transform in step 410. This the most computationally expensive step.

Following the Fourier transform, the appropriate focus factor, $\lambda z_q e^{-i\varphi_q(x,y)}$, is added to each layer in step 415. The image layers are slices through the image at different depths along the projection axis. The focus factor depends on the depth of the image layer within the three dimensional image and ensures that the three dimensional image is reconstructed correctly.

In step 420 a further pseudo random phase contribution is introduced in order to generate a plurality of holographic sub-frames. The pseudo random phase contribution introduced in step 420 is independent of the co-ordinates (u, v) within each transformed image layer.

This means that the further pseudo random phase contribution can be applied after the Fourier transform step.

The further pseudo random phase contribution is added to each transformed image layer following step 415. Each image layer receives a different pseudo random phase factor. The image layers are subsequently summed in step 425 to generate a holographic sub-frame in step 430. However steps 420 and 425 are repeated a plurality of time with different further random phase contributions added to each image layer with each iteration.

The further random phase contribution can be expressed as $\Theta_{prand}(q, k)$, where q is the image layer number and k is an iteration number. The complex field for each image frame can then be written as:

$$H_j(x, y) = \lambda \sum_{q=0}^{layercount} z_q e^{-i\varphi_q(x,y)} F^{-1}\{\psi(u, v, z_q) e^{i2\pi\vartheta_j(u,v) + \vartheta_{prand}(q,k)}\}$$

As the pseudo random phase contribution is independent of the co-ordinates (u, v) within each transformed image layer, this can be rewritten as:

$$H_j(x, y) = \lambda \sum_{q=0}^{layercount} z_q e^{-i\varphi_q(x,y)} e^{i2\pi\vartheta_{prand}(q,k)} F^{-1}\{\psi(u, v, z_q) e^{i2\pi\vartheta_j(u,v)}\}$$

Because the further pseudo-random phase contribution is applied after the Fourier transform step, this allows a plurality of holographic sub-frames to be generated from a single set of Fourier transformed input image layers with relatively little computational overhead.

The spatial light modulator is driven with the plurality of holographic sub-frames in rapid temporal succession. This produces an image that is perceived by the human eye to have relatively little noise as the noise is cancelled out by averaging over a plurality of sub-frames.

It can be seen that in order to produce a single holographic sub-frame, it is necessary to perform as many Fourier Transforms as the number of input image layers, which is typically 256. Without using the described technique of adding a further random phase contribution, to create the next sub-frame, another 256 Fourier transforms need to be executed. Since the Fourier transform operation is the most time-consuming, the execution time of the holographic algorithm would scale linearly with the number of holographic sub-frames. For good noise cancellation, as many as 24 holographic sub-frames per image frame are needed, extending the hologram generation time (depending on the number of layers) to several seconds. This is not practical when trying to produce moving images.

By adding a further random phase contribution after the Fourier transform, a plurality of holographic sub-frames can be produced without the need to execute more Fourier transforms. A plurality of holographic sub-frames may be produced from a single image frame by performing steps 405 to 425 a plurality of times. The sub-frames produced by the addition of the further pseudo random phase contribution after the Fourier transform step may be referred to as pseudo sub-frames. To produce 24 holographic sub-frames, it is possible, for example, to produce three lots of eight pseudo sub-frames by performing steps 405, 410 and 415 for three iterations with different initial random phase added in step 405 with each iteration, and for each of the three iterations producing eight pseudo sub-frames by performing step 420 and 425 for eight iterations, with different further pseudo random phase contributions added in each iteration. In practice this produces a four-fold speed up by producing an image with a quality equivalent to performing 12 iterations of steps 405 to 415, while only needing to perform those steps for three iterations.

Figure 5:
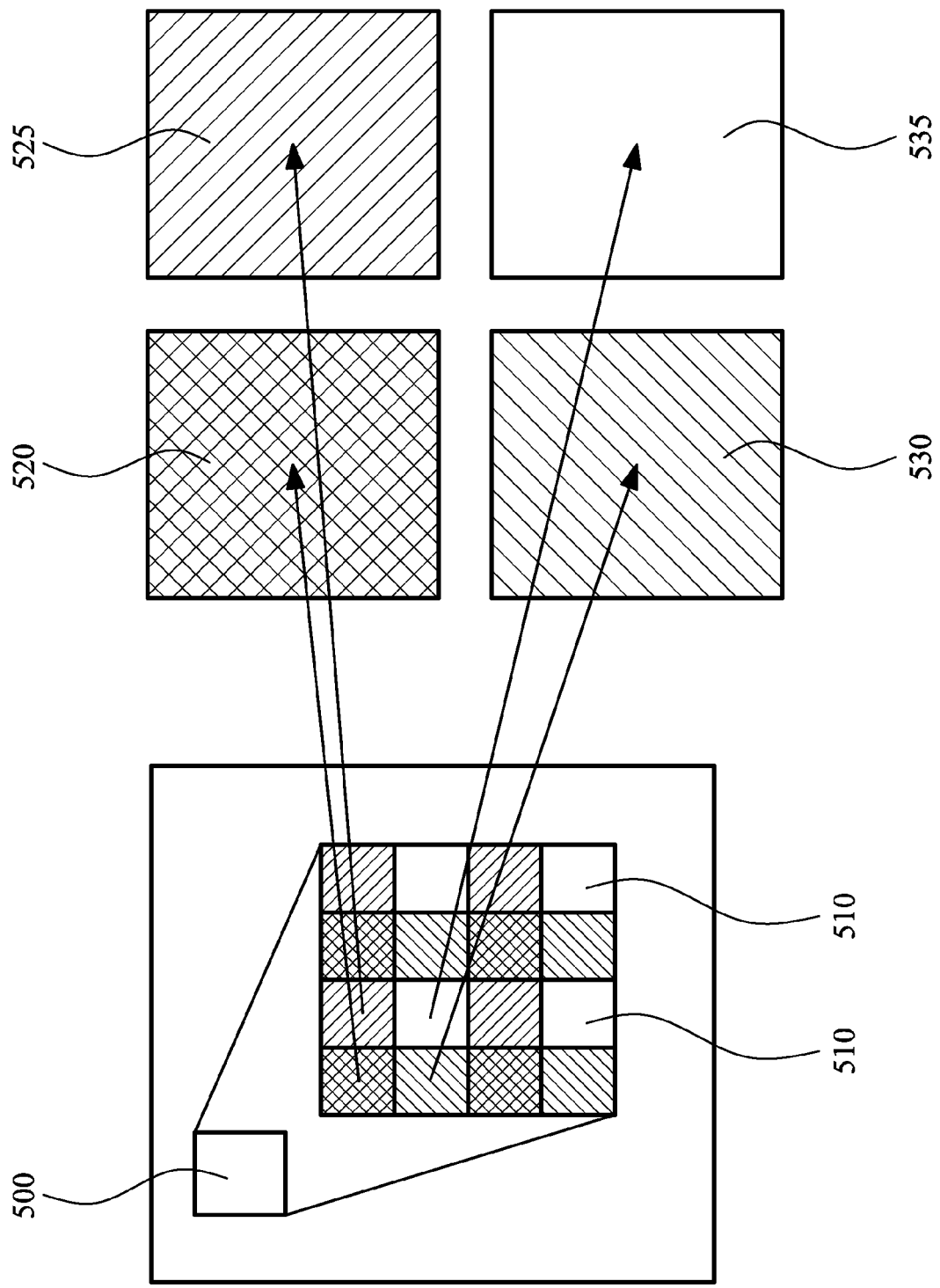
FIG. 5 illustrates the division of a higher resolution image layer into four lower resolution image layers.
Figure 6:
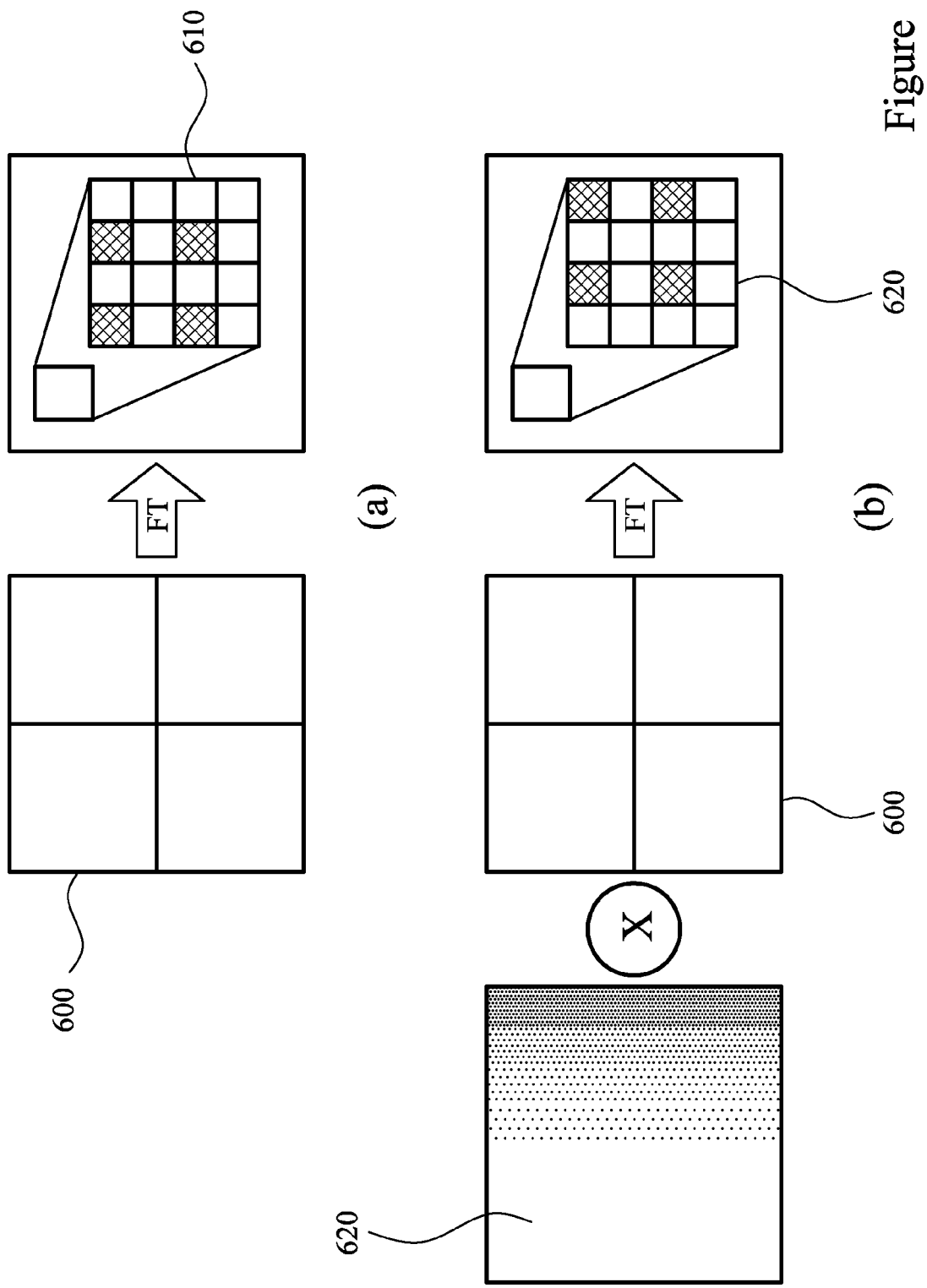
FIGS. 6a and 6b illustrate the shifting of a transformed image layer in the replay field.

An additional technique to reduce the computation expense of generating holographic frames is to divide each image layer using a tiling technique. Each image layer is divided into a plurality of lower resolution images, which are then Fourier transformed. The transformed layers are then recombined in the hologram plane. A first example is illustrated in FIGS. 5 and 6.

Each image layer is first separated into a plurality of lower resolution sub-images. In the example of FIGS. 5 and 6, there are four sub-images, although 8 or 16 sub-image could be used in the same type of scheme. The image layer 500 is split into a plurality of 2×2 grids 510. Each sub-image is then formed by taking spatially corresponding pixels from each 2×2 grid. So, in this example, one sub-image is formed from pixels 520 taken from the top left position within each 2×2 grid, a second sub-image is formed from pixels 525 from the top right position, a third sub-image is formed from pixels 530 from the bottom left position, and a fourth sub-image is formed from pixels 535 from the bottom right position.

Each of the sub-images is then processed according to the process described in relation to FIG. 4 to produce holographic sub-frames. In particular each sub-image undergoes a Fourier transform. Because each sub-image has a quarter of the number of pixels, each sub-image is less computationally expensive to process.

The result of the Fourier transform of each sub-image is a hologram which is a quarter of the size of the original image frame. In order to reproduce an image of the original size, each of the smaller holograms are tiled in the replay field, and displayed in rapid succession. FIGS. 6a and 6b illustrate the tiling process. Each smaller holographic sub-frame 610 is sampled in the replay field so that it is distributed over a plurality of 2×2 grids, but with only the upper left pixel populated in each grid. This is shown in FIG. 6a. The sub-image 600 is transformed to produce low resolution hologram 610. In order to shift each pixel to the correct position in the replay field a variable image tilt 620 is applied to each sub-image 600 prior to the Fourier transform, depending on the portion of the original image it is based on, to produce a shifted low-resolution hologram 620. This is illustrated in FIG. 6b.

Figure 7:
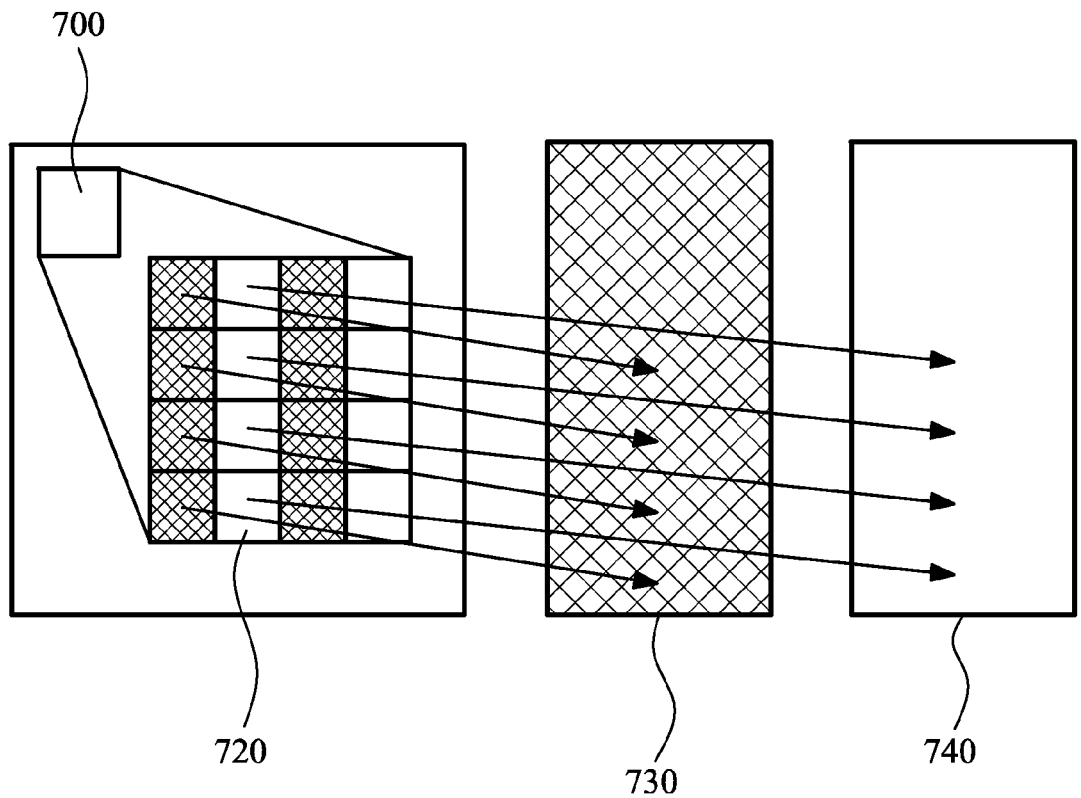
FIG. 7 illustrates the division of a higher resolution image layer into two lower resolution image layers.
Figure 8:
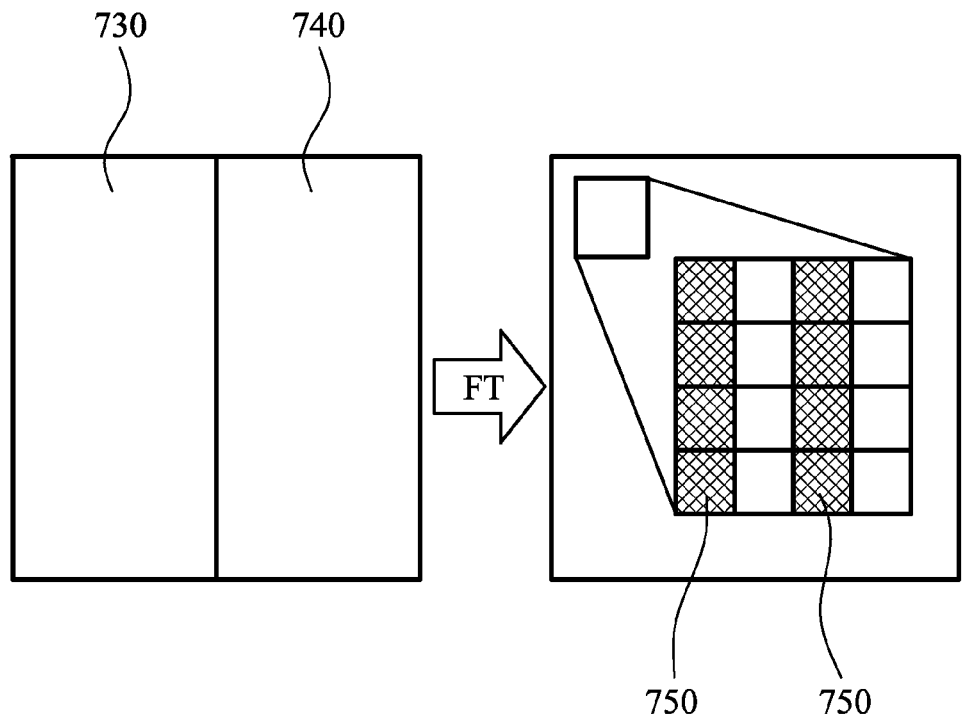
FIG. 8 illustrates the shifting of a transformed image layer in the replay field.

FIGS. 7 and 8 illustrate another example of a tiling process. In the example of FIGS. 7 and 8 the tiling is performed across only one dimension of the two-dimensional image layer. Each pixel 720 in the higher resolution image 700 is assigned to one of two lower resolution sub-images. In this example each pixel is assigned to a different sub-image to the adjacent pixels in the horizontal dimension. But each pixel is assigned to the same sub-image as the adjacent pixels in the vertical dimension. This results in two lower resolution sub-images 730, 740, each of which has a different aspect ratio to the original higher resolution image.

Each of the sub-images is then processed according to the process described in relation to FIG. 4 to produce holographic sub-frames. In particular each sub-image undergoes a Fourier transform. Because each sub-image has a half of the number of pixels, each sub-image is less computationally expensive to process.

The result of the Fourier transform of each sub-image is a hologram which is a half of the size of the original image frame. In order to reproduce an image of the original size, each of the smaller holograms are tiled in the replay field, and displayed in rapid succession. This is illustrated in FIG. 8. Each smaller holographic sub-frame is sampled in the replay field so that it is distributed over a plurality of vertical lines 750. In order to shift each pixel to the correct position in the replay field a variable image tilt is applied to each sub-image prior to the Fourier transform, depending on the portion of the original image it is based on, to produce a shifted low-resolution hologram, in the same manner as described with reference to FIG. 6.

As well as reducing computation time, the tiling process has an additional benefit that spatially adjacent pixels in the hologram ae displayed at different times. This eliminates interference effects between adjacent pixels. But the human eye and brain will merge the sub-frames if they are displayed rapidly enough so that a single higher resolution image is experienced by the viewer.

An additional step that can be taken to reduce computing time is to reduce the number of image layers used prior to generating the holographic sub-frames. For example, if the image data received contains 256 image layers it is possible to merge image layers to reduce the number of layers that need to be processed and in particular need to be Fourier transformed. This may be described as layer decimation in which the number of image layers is reduced by a decimation factor. For example, with a decimation factor of 4, all the pixels from image layers 1, 2, 3 and 4 are contained in a new decimated layer 1. Layers 5, 6, 7 and 8 are contained in decimated layer 2, and so on. Where occupied pixels from the original image layers overlap in a decimated layer, an average value can be used.

A further step that can be taken to reduce computing time, is to identify the image layers that contain any occupied pixels and then to reorder the layers so that any empty layers are not transformed. GPU's, such as those using NVidia's CUDA language, typically do not have the capability to perform branch prediction. Image layers are processed in parallel in a batch operation, so that skipping empty layers at runtime does not result in a speed up of operation. In the example that four layers are processed in parallel, and layers 1 and 4 contain pixels but layers 2 and 3 do not, the GPU will still perform the Fourier transform operation on all four layers, even though it is not necessary for two for the layers.

So to reduce processing load, empty image layers can be identified before processing and then the layers rearranged to ensure optimal use of the GPU. The method may comprise the following steps:

parse the input image data to determine which image layers contain occupied pixels i.e. are non-empty layers rearrange the layer information to stack non-empty layers next to each other perform the Fourier transform operation on only the non-empty layers apply appropriate focus factors to the transformed layers, as described with reference to FIG. 4.

Figure 9:
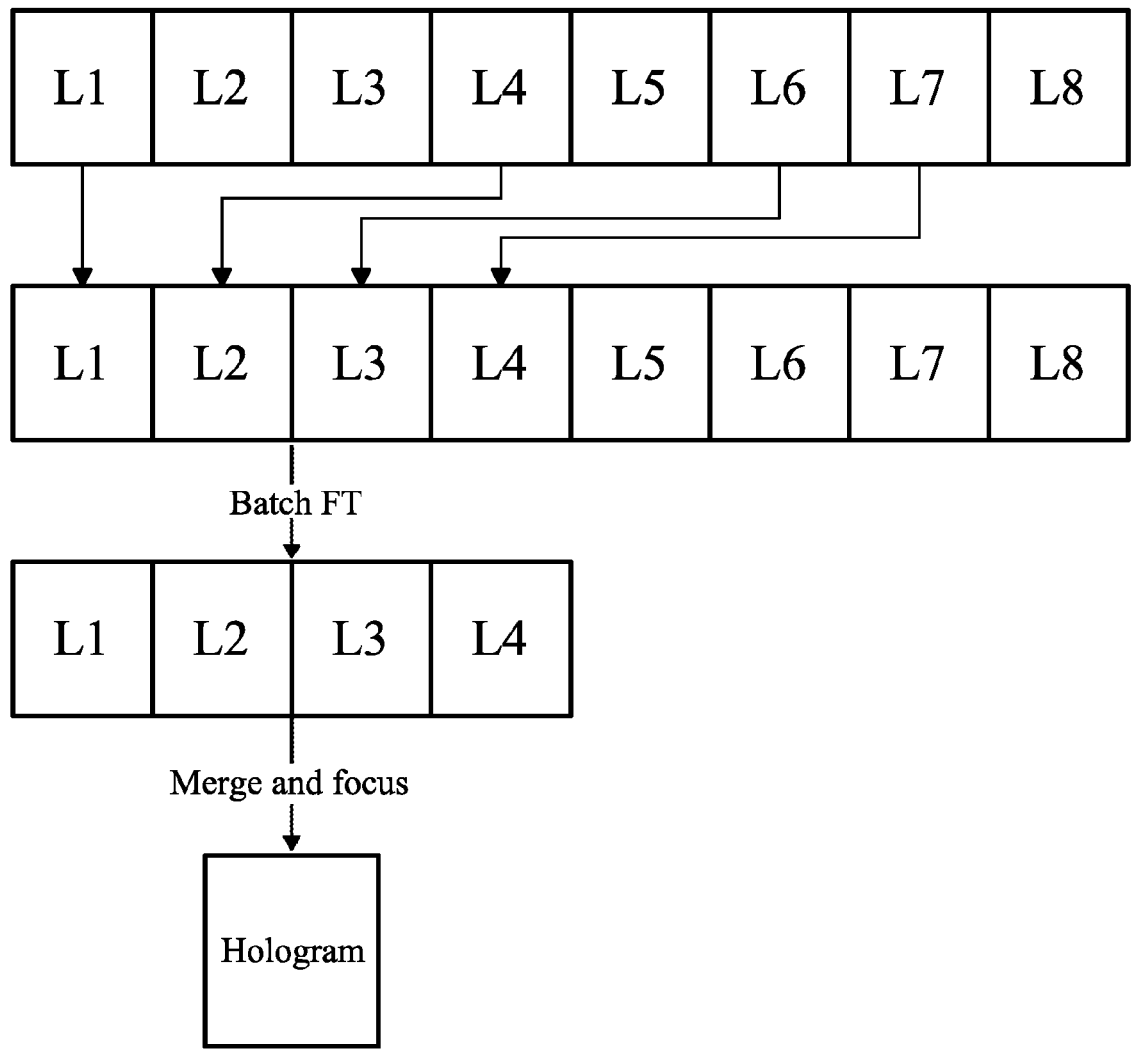
FIG. 9 illustrates a process or rearranging image layers prior to processing.

FIG. 9 illustrates the reordering process in the example of eight image layers with layers 2, 3, 5 and 8 being empty. It can be seen that original layer one corresponds to reordered layer 1, original layer 4 becomes layer 2, layer 6 becomes layer 3, and layer 7 becomes layer 4. Then only the four layers containing occupied pixels are transformed before being merged. This process can significantly speed up processing, particularly with sparse point cloud data. The reordering process is carried out before any other processing steps. Referring to FIG. 2, the reordering process is carried out in the GPU 14, under the control of the controller 18, as soon as the GPU 14 receives the image layers.

By using the techniques described it is possible to significantly speed up the process of generating holographic sub-frames so that real-time moving image holograms of acceptable resolution can be generated using standard GPU hardware. In practice, the speed-up can be more than two orders of magnitude.

What is claimed is:

1. A holographic image display system comprising:
   a coherent, or a partially-coherent light source;
   a spatial light modulator illuminated by the coherent, or partially-coherent light source;
   a processor configured to drive the spatial light modulator with output hologram data, the processor receiving image data at an input and producing output hologram data based on the image data,
   wherein the image data comprises three-dimensional image data that is separable into a plurality of two-dimensional image layers at different image planes, and wherein the processor is configured to:
   a) perform a Fourier transform on each image layer to provide a transformed image layer,
   b) apply a focus factor to each transformed image layer,
   c) apply a pseudo-random phase factor to each transformed image layer wherein the pseudo-random phase factor is constant across each transformed image layer, and
   d) sum the transformed image layers to form a holographic sub-frame,
   e) repeat steps (c) and (d) for a plurality of iterations, applying a different pseudo-random phase factor to the transformed image layers in each iteration to form a plurality of holographic sub-frames, the plurality of holographic sub-frames forming the output hologram data; and
   f) drive the spatial light modulator with the holographic sub-frames in rapid temporal succession.

2. A holographic image display system according to claim 1, wherein the processor is configured to apply an initial random phase factor to each image layer in step (x), prior to step (a).

3. A holographic image display system according to claim 2, wherein the processor is configured to repeat steps (x) to (e) for a plurality of iterations for each image layer prior to performing step (f), with a different initial random phase factor applied to corresponding image layers in each iteration, to produce the plurality of holographic sub-frames.

4. A holographic image display system according to claim 2, wherein each initial random phase factor comprises a phase value for each pixel in the image layer, and wherein the phase values are statistically uniformly distributed across the image layer.

5. A holographic image display system according to claim 1, wherein the image data comprises a plurality of two-dimensional image layers at different image planes, each two-dimensional image layer comprising a plurality of pixels, and wherein the processor is configured to split each two-dimensional image layer into a plurality of lower resolution image layers in the same image plane, such that adjacent pixels in the two-dimensional image layers are in different lower resolution image layers, the plurality of lower resolution image layers being the image layers on which step (a) is performed in parallel to form a plurality of transformed sub-images, wherein the transformed sub-images are tiled to form the transformed image layers.

6. A holographic image display system according to claim 1, wherein the image data comprises a point cloud comprising a plurality of points in three dimensional space, and wherein the point cloud is separated into the plurality of two-dimensional image layers, so that the points of the point cloud occupy pixels in the plurality of image layers.

7. A holographic image display system according to claim 6, wherein the processor is configured to combine a plurality of adjacent image layers so that all the pixels in the plurality of adjacent image layers are contained in a single, combined image layer before step (a).

8. A holographic image display system according to claim 6, wherein the processor is configured determine which image layers do not contain any occupied pixels and to reorder a sequence of the image layers within the processor so that the image layers that do not contain any occupied pixels are adjacent to one another in the sequence, and wherein steps (a) to (f) are performed only for layers that contain at least one occupied pixel.

9. A method of generating a hologram from a three-dimensional image data set, the three-dimensional data set being separated into a plurality of two-dimensional image layers at different image planes, comprising:
  a) performing a Fourier transform on each image layer to provide a transformed image layer,
  b) applying a focus factor to each transformed image layer,
  c) applying a pseudo-random phase factor to each transformed image layer, and
  d) combining the transformed image layers to form a holographic sub-frame,
  e) repeating steps (c) and (d) for a plurality of iterations, applying a different pseudo-random phase factor to the transformed image layers in each iteration to form a plurality of holographic sub-frames; and
  f) driving a spatial light modulator with the holographic sub-frames in rapid temporal succession and illuminating the spatial light modulator with a coherent light source.

10. A method according to claim 9, comprising the step of applying an additional random phase factor to each image layer prior to step (a).

11. A method according to claim 9, wherein each image layer comprises a plurality of pixels, and wherein step (a) comprises separating each image layer into a plurality of sub-images, such that adjacent pixels in the image layer are in different sub-images, performing the Fourier transform on each sub-image to provide a plurality of transformed sub-images, and tiling the transformed sub-images to form a transformed image layer.

12. A method according to claim 9, wherein the image data comprises a point cloud comprising a plurality of points in three dimensional space, the method comprising separating the point cloud into the plurality of two-dimensional image layers so that the points of the point cloud occupy pixels in the plurality of image layers.

13. A method according to claim 12, comprising the step of combining a plurality of adjacent image layers so that pixels from the plurality of adjacent image layers are contained in a single, combined image layer before step (a).

14. A method according to claim 12, comprising determining which image layers do not contain any occupied pixels and reordering a sequence of the image layers so that image layers that do not contain any occupied pixels are adjacent to one another in the sequence, and wherein steps (a) to (f) are performed only for layers that contain at least one occupied pixel.

15. A holographic image display system comprising:
  a coherent, or a partially-coherent light source;
  a spatial light modulator illuminated by the coherent, or partially-coherent light source;
  a processor configured to drive the spatial light modulator with output hologram data, the processor receiving image data at an input and producing output hologram data based on the image data,
  wherein the image data comprises three-dimensional image data that is separable into a plurality of two-dimensional image layers at different image planes, and wherein the processor is configured to:
    a) perform a space-frequency transform on each image layer to provide a transformed image layer,
    b) apply a focus factor to each transformed image layer,
    c) apply a pseudo-random phase factor to each transformed image layer wherein the pseudo-random phase factor is constant across each transformed image layer, and
    d) sum the transformed image layers to form a holographic sub-frame,
    e) repeat steps (c) and (d) for a plurality of iterations, applying a different pseudo-random phase factor to the transformed image layers in each iteration to form a plurality of holographic sub-frames, the plurality of holographic sub-frames forming the output hologram data; and
    f) drive the spatial light modulator with the holographic sub-frames in rapid temporal succession.

16. A holographic image display system according to claim 15, wherein the processor is configured to apply an initial random phase factor to each image layer in step (x), prior to step (a).

17. A holographic image display system according to claim 16, wherein the processor is configured to repeat steps (x) to (e) for a plurality of iterations for each image layer prior to performing step (f), with a different initial random phase factor applied to corresponding image layers in each iteration, to produce the plurality of holographic sub-frames.

18. A holographic image display system according to claim 16, wherein each initial random phase factor comprises a phase value for each pixel in the image layer, and wherein the phase values are statistically uniformly distributed across the image layer.

19. A holographic image display system according to claim 15, wherein the image data comprises a plurality of two-dimensional image layers at different image planes, each two-dimensional image layer comprising a plurality of pixels, and wherein the processor is configured to split each two-dimensional image layer into a plurality of lower resolution image layers in the same image plane, such that adjacent pixels in the two-dimensional image layers are in different lower resolution image layers, the plurality of lower resolution image layers being the image layers on which step (a) is performed in parallel to form a plurality of transformed sub-images, wherein the transformed sub-images are tiled to form the transformed image layers.

20. A holographic image display system according to claim 15, wherein the image data comprises a point cloud comprising a plurality of points in three dimensional space, and wherein the point cloud is separated into the plurality of two-dimensional image layers, so that the points of the point cloud occupy pixels in the plurality of image layers, wherein the processor is configured determine which image layers do not contain any occupied pixels and to reorder a sequence of the image layers within the processor so that the image layers that do not contain any occupied pixels are adjacent to one another in the sequence, and wherein steps (a) to (f) are performed only for layers that contain at least one occupied pixel.

\* \* \* \* \*